US012012977B2

(12) United States Patent
Dong et al.

(10) Patent No.: US 12,012,977 B2
(45) Date of Patent: Jun. 18, 2024

(54) AUTO-LOCK HYDRAULIC HOIST CYLINDER DEVICE AND CONTROL METHOD THEREOF

(71) Applicant: CHINA THREE GORGES CORPORATION, Beijing (CN)

(72) Inventors: Yantong Dong, Beijing (CN); Shaojie Yang, Beijing (CN)

(73) Assignee: CHINA THREE GORGES CORPORATION, Beijing (CN)

( * ) Notice: Subject to any disclaimer, the term of this patent is extended or adjusted under 35 U.S.C. 154(b) by 0 days.

(21) Appl. No.: 17/297,916

(22) PCT Filed: Nov. 12, 2020

(86) PCT No.: PCT/CN2020/128431
§ 371 (c)(1),
(2) Date: May 27, 2021

(87) PCT Pub. No.: WO2022/000933
PCT Pub. Date: Jan. 6, 2022

(65) Prior Publication Data
US 2023/0115414 A1 Apr. 13, 2023

(30) Foreign Application Priority Data
Jun. 30, 2020 (CN) ......................... 202010613552.5

(51) Int. Cl.
*F15B 15/26* (2006.01)
*F15B 15/14* (2006.01)
*F15B 15/28* (2006.01)

(52) U.S. Cl.
CPC ........ *F15B 15/261* (2013.01); *F15B 15/1428* (2013.01); *F15B 15/2815* (2013.01); *F15B* *2015/268* (2013.01)

(58) Field of Classification Search
CPC ............... F15B 15/261; F15B 15/1428; F15B 15/2815; F15B 2015/268
See application file for complete search history.

(56) References Cited

U.S. PATENT DOCUMENTS 2,139,185 A * 12/1938 Engel .................... F15B 15/261 91/44
2,811,136 A * 10/1957 Westcott, Jr. ......... F15B 15/261 92/24
(Continued)

FOREIGN PATENT DOCUMENTS

CN 105422548 A 3/2016
CN 111649025 A 9/2020
(Continued)

OTHER PUBLICATIONS

International Search Report of PCT/CN2020/128431.
Written Opinion of PCT/CN2020/128431.

*Primary Examiner* — Dustin T Nguyen

(57) ABSTRACT

The invention provides an auto-lock hydraulic hoist cylinder device, comprising: a lock actuator, a lock transmission mechanism and a load-bearing mechanism, wherein the load-bearing mechanism includes load-bearing locking shaft, a load-bearing nut is provided on the load-bearing locking shaft, installed on the upper side of the upper end cover of the main hydraulic hoist, a number of protrusions is provided on the lower end of the load-bearing locking shaft, a locking cover is provided with a through hole for the load-bearing locking shaft to pass through, a groove for matching the protrusions is provided on the side wall of the through hole, a piston rod is fixed on the lower end of the locking cover, the lock actuator is provided on the upper end cover, the lock actuator drives the load-bearing locking shaft through the lock transmission mechanism.

9 Claims, 7 Drawing Sheets

(56) References Cited

U.S. PATENT DOCUMENTS

| | | | | | |
|---|---|---|---|---|---|
| 3,453,937 | A | * | 7/1969 | Haberman | F15B 15/261<br>91/1 |
| 3,757,650 | A | * | 9/1973 | DeKiss | F15B 15/261<br>92/25 |
| 3,799,036 | A | * | 3/1974 | Slaughter | F15B 15/261<br>92/24 |
| 4,635,536 | A | * | 1/1987 | Liu | F15B 15/261<br>92/24 |
| 4,784,037 | A | * | 11/1988 | Fabyan | F15B 11/20<br>91/410 |
| 10,018,009 | B2 | * | 7/2018 | Kroesen | E21B 33/062 |

FOREIGN PATENT DOCUMENTS

| | | | |
|---|---|---|---|
| CN | 212297118 | U | 1/2021 |
| GB | 608704 | A | 9/1948 |
| JP | 62180104 | A | 8/1987 |

* cited by examiner

AUTO-LOCK HYDRAULIC HOIST CYLINDER DEVICE AND CONTROL METHOD THEREOF

CROSS-REFERENCE TO RELATED APPLICATIONS

This Application is a national stage application of PCT/CN2020/128431. This application claims priorities from PCT Application No. PCT/CN2020/128431, filed Nov. 12, 2020, and from the Chinese patent application 202010613552.5 filed Jun. 30, 2020, the content of which are incorporated herein in the entirety by reference.

TECHNICAL FIELD OF THE INVENTION

The invention relates in general to the field of hydraulic hoist used for hydraulic and hydroelectric engineering, and in particular to an auto-lock hydraulic hoist cylinder device and control method thereof.

DESCRIPTION OF THE PRIOR ART

Due to operational requirements, a hydraulic hoist often need to be mechanically locked reliably with the piston rod retracted in order to ensure the piston rod's position. At present, the locking devices included in the hydraulic hoist cylinder are mostly manually operated mechanisms, which are still inconvenient for persons to operate in a place with poor environment and small space. There are also some locking devices controlled by single-rod hydraulic cylinders, and most of them still have a link mechanism, due to factors such as more parts and frequent operation wear, their reliability will be deteriorated. In addition, narrow space is not conducive to arranging those operating mechanism, so their applicability are poor.

SUMMARY OF THE INVENTION

The technical problem to be solved by the invention is to provide an auto-lock hydraulic hoist cylinder device and control method thereof, which are used in places where the environment is poor and inconvenient for persons to manually operate, thereby improving operation efficiency and ensuring the operators' safety.

In order to solve the above problems, the technical solution adopted by the present invention is as follows: An auto-lock hydraulic hoist cylinder device, comprising: a lock actuator, a lock transmission mechanism and a load-bearing mechanism, wherein said load-bearing mechanism includes a load-bearing locking shaft, a load-bearing nut is provided on said load-bearing locking shaft, installed on the upper side of an upper end cover of a main hydraulic hoist, a number of protrusions are provided on the lower end of said load-bearing locking shaft, a locking cover is provided with a through hole for said load-bearing locking shaft to pass through, a groove for matching said protrusions is provided on the side wall of the through hole, a piston rod is fixed with the lower end of said locking cover, said lock actuator is provided on said upper end cover, and drives said load-bearing locking shaft through said lock transmission mechanism.

In a preferred embodiment, said lock actuator includes a two-way cylinder-operated hydraulic cylinder, a unit piston rod at both ends of said two-way cylinder-operated hydraulic cylinder is installed on said upper end cover through a support, said lock transmission mechanism includes a rack arranged on the outer wall of a movable hydraulic cylinder of said two-way cylinder-operated hydraulic cylinder, said rack meshes with a gear encircling the upper end of said load-bearing locking shaft.

In a preferred embodiment, said load-bearing nut is fixed by a locking nut.

In a preferred embodiment, said device further includes a positioning system having an unlocking position sensor, a main hydraulic hoist and a sensor contact head, said unlocking position sensor and said locking position sensor are provided on said upper end cover, said sensor contact head is provided on said load-bearing nut.

In a preferred embodiment, an electromagnetic bolt with position feedback is provided on said upper end cover, said electromagnetic bolt is installed on said upper end cover through an electromagnetic bolt support, a bolt hole matching with the bolt head of said electromagnetic bolt is provided on said load-bearing nut.

In a preferred embodiment, the length L of said rack is $\pi r/n$, n is the number of said protrusions, and r is the pitch radius of said gear.

In a preferred embodiment, the included angle $\beta$ between said unlocking position sensor and said locking position sensor is $180°/n$, and n is the number of said protrusions.

The present invention also provides a control method of an auto-lock hydraulic hoist cylinder device, comprising:

steps form unlocking status to locking status that include the following steps:

S1: injecting hydraulic oil into the rod cavity side of said main hydraulic hoist, said hydraulic oil acting on the lower end of said piston to drive said piston rod to move upwards, and to drive said locking cover to move upwards, said protrusion passing along said groove, said groove moving to the top of said protrusion, said piston contacting the lower end surface of a limit block fixed on said upper end cover and then stopping its movement, S2: said lock actuator driving said load-bearing locking shaft to rotate after being driven by the lock transmission mechanism to misalign said protrusion and said groove, S3: decompressing the rod cavity side of said main hydraulic hoist, said piston rod moving downwards, said protrusion contacting said locking cover, the load being transferred to said upper end cover through said load-bearing locking shaft and said load-bearing nut to complete locking, steps form locking status to unlocking status that include the following steps:

B1: injecting hydraulic oil into the rod cavity side of said main hydraulic hoist, said hydraulic oil acting on the lower end of said piston to drive said piston rod to move upwards, and to drive said locking cover to move upwards, the upper end surface of said piston contacting the lower end surface of said limit block fixed on said upper end cover and then stopping its movement, said protrusion being separated from said locking cover, and the load being borne by the hydraulic oil, B2: said lock actuator driving said load-bearing locking shaft to rotate after being driven by the lock transmission mechanism to align said protrusion and said groove, B3: injecting hydraulic oil into the rodless cavity side of said main hydraulic hoist, said hydraulic oil acting on the upper end of said piston to drive said piston rod to move downwards, discharging the hydraulic oil in the rod cavity side of said main hydraulic hoist, said locking cover moving downwards to unlock, after unlocking, the hydraulic oil acting on said piston in said main hydraulic hoist to drive said piston rod to perform the required operation.

In a preferred embodiment, during the operation process from unlocking status to locking status, in S2, before said load-bearing locking shaft rotates, said electromagnetic bolt with position feedback is energized, and the bolt head of said electromagnetic bolt retracts to unlock said load-bearing mechanism, in S3, said bolt head of said electromagnetic bolt is inserted into said bolt hole to lock sad load-bearing mechanism; during the operation process from locking status to unlocking status, in B2, before said load-bearing locking shaft rotates, said electromagnetic bolt with position feedback is energized, and the bolt head of said electromagnetic bolt retracts to unlock said load-bearing mechanism, in B3, said bolt head of said electromagnetic bolt is inserted into said bolt hole to lock sad load-bearing mechanism An auto-lock hydraulic hoist cylinder device and control method thereof provided by the invention have the following beneficial effects 1. The lock actuator adopts the two-way cylinder-operated hydraulic cylinder, which effectively reduces occupied space and makes layout more compact. It can be used in places that are inconvenient for persons to manually operate with small space and poor environment.
2. The lock transmission mechanism adopts cooperation between the rack and the gear, which can ensure the input torque of the load-bearing locking shaft by adjusting the diameter of the gear, thereby better optimizing the pressure and volume of the two-way cylinder-operated hydraulic cylinder.
3. The lock transmission mechanism adopts cooperation between the rack and the gear, which can ensure the rotation angle of the load-bearing locking shaft by adjusting the diameter of the gear, thereby controlling the number of protrusions at the lower end of the load-bearing locking shaft to evenly distribute the load on the load-bearing locking shaft.
4. The locking cover is installed inside the main hydraulic hoist to cooperate with the load-bearing locking shaft to perform lock action, with few hidden parts, high connection reliability and convenient maintenance.
5. The rack length L is πr/n, and a sector angle β formed by the unlocking position sensor and the locking position sensor is 180°/n, the effective contact length L between the rack and the gear is (π/180)rβ, thereby ensuring the rotation angle of the load-bearing locking shaft on the two aspect of mechanical structure and electrical control, preventing the rotation angle of the load-bearing locking shaft from deviating when the unlocking position sensor or the locking position sensor fails.
6. The lock to anti-movement adopts cooperation between the electromagnetic bolt with position feedback and the bolt hole on the load-bearing nut, having compact layout and high atomization, thereby enabling operators to realize remote control.

BRIEF DESCRIPTION OF THE DRAWINGS

The invention will be further described with reference to the drawings and embodiments as follows.

Figure 1:
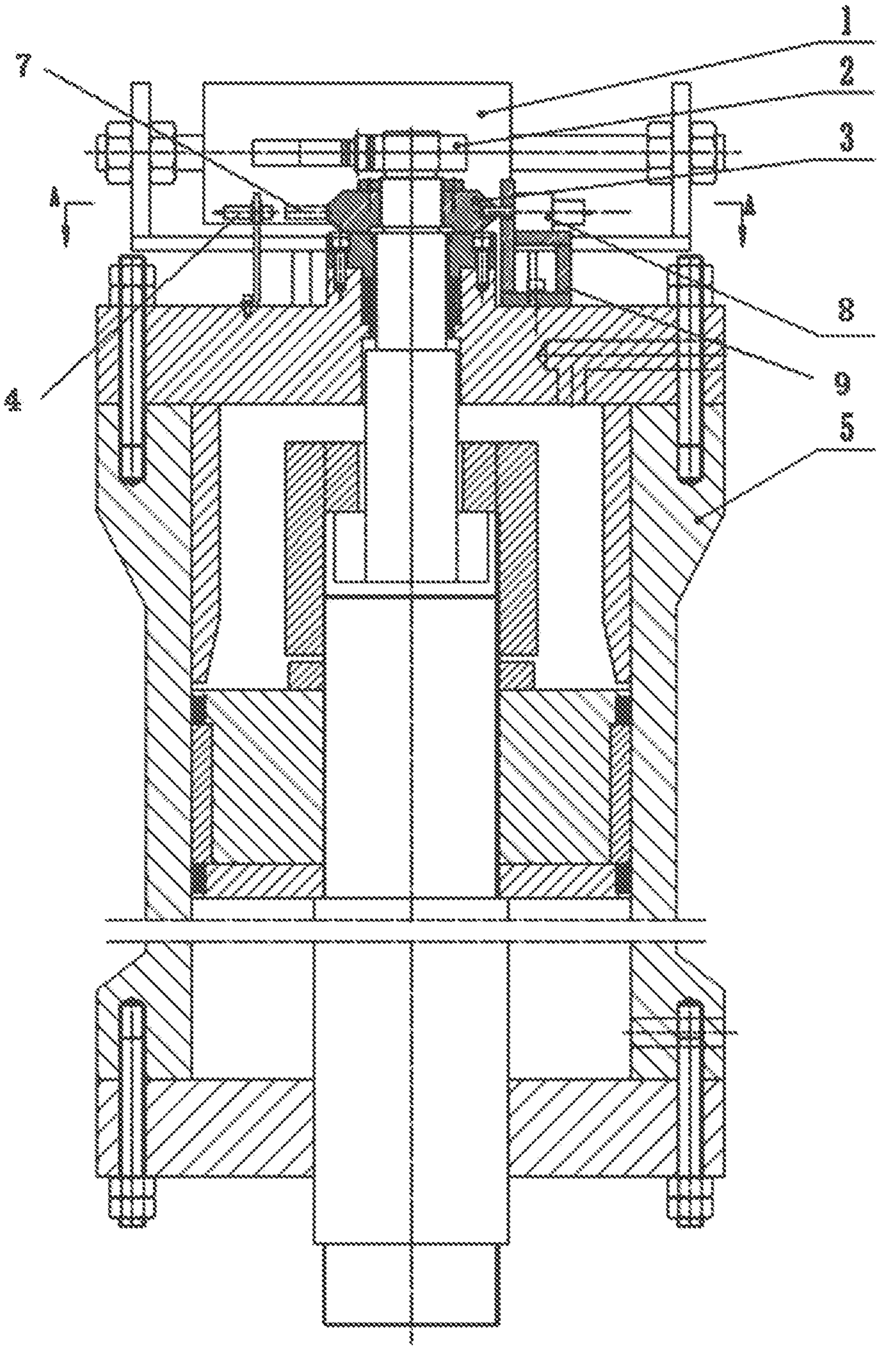
FIG. 1 is a schematic diagram of the overall structure in a locking state of the invention.

1—lock actuator, 2—lock transmission mechanism, 3—load-bearing mechanism, 4—unlocking position sensor, 5—main hydraulic hoist, 6—locking position sensor, 7—sensor contact head, 8—electromagnetic bolt, 9—electromagnetic bolt support, 101—two-way cylinder-operated hydraulic cylinder, 102—unit piston rod, 103—support, 104—movable hydraulic cylinder, 201—rack, 202—gear, 301—load-bearing locking shaft, 302—load-bearing nut, 303—protrusion, 304—locking cover, 305—groove, 306—bolt hole, 501—pressure cover, 502—upper end cover, 503—limit block, 504—cylinder barrel, 505—piston, 506—piston rod, 507—bottom end cover

DETAILED DESCRIPTION OF THE INVENTION

As shown in FIG. 1, FIG. 3, FIG. 5 and FIG. 7, an auto-lock hydraulic hoist cylinder device, comprising: a lock actuator 1, a lock transmission mechanism 2 and a load-bearing mechanism 3, wherein said load-bearing mechanism includes a load-bearing locking shaft 301, a load-bearing nut 302 is provided on said load-bearing locking shaft 301, installed on the upper side of an upper end cover 502 of a main hydraulic hoist 5, a number of protrusions 303 are provided on the lower end of said load-bearing locking shaft 301, a locking cover 304 is provided with a through hole for said load-bearing locking shaft 301 to pass through, a groove 305 for matching said protrusions 303 is provided on the side wall of the through hole, a piston rod 506 is fixed with the lower end of said locking cover 304, said lock actuator 1 is provided on said upper end cover 502, and drives said load-bearing locking shaft 301 through said lock transmission mechanism 2.

Figure 2:
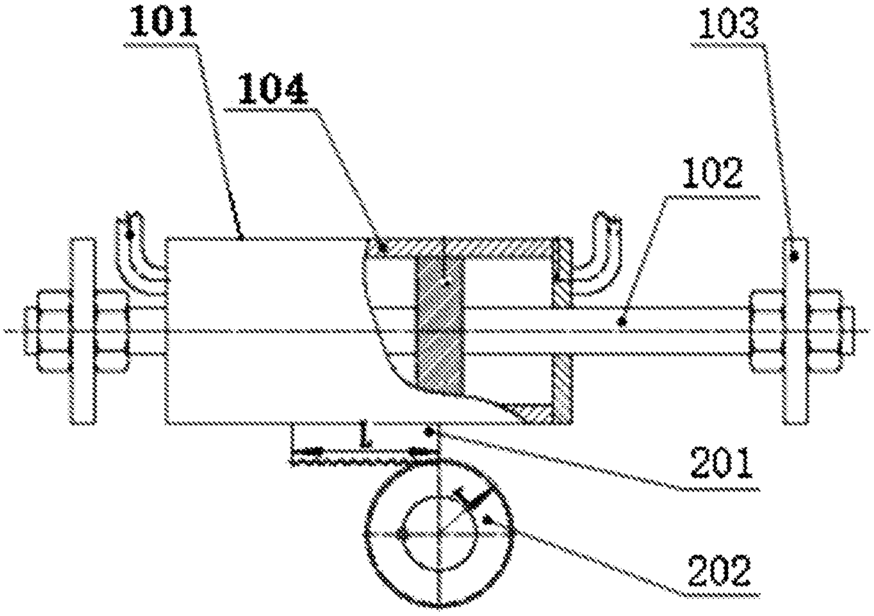
FIG. 2 is a schematic diagram of cooperation between the lock actuator and the lock transmission mechanism in the locking state of the invention.
Figure 3:
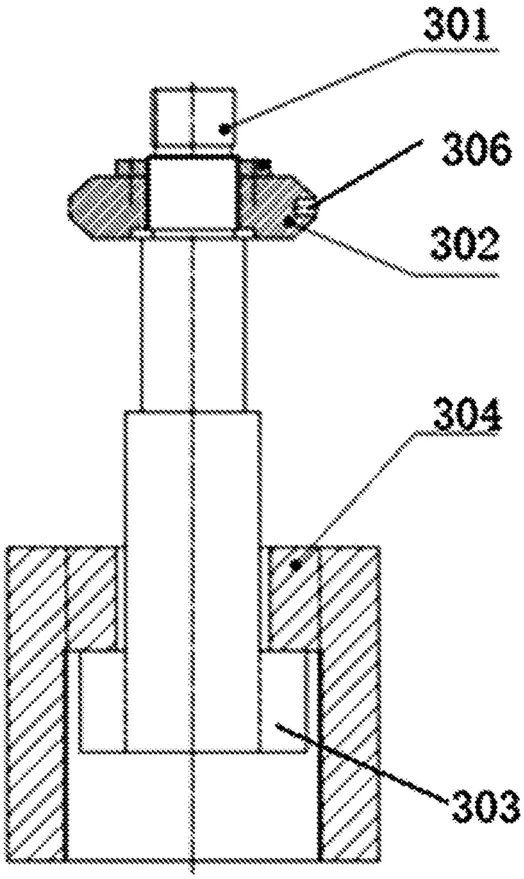
FIG. 3 is a schematic diagram of the load-bearing mechanism in the locking state of the invention.

In this embodiment, as shown in FIG. 2, said lock actuator 1 includes a two-way cylinder-operated hydraulic cylinder 101, a unit piston rod 102 at both ends of said two-way cylinder-operated hydraulic cylinder 101 is installed on said upper end cover 502 through a support 103, said lock transmission mechanism 2 includes a rack 201 arranged on the outer wall of a movable hydraulic cylinder 104 of said two-way cylinder-operated hydraulic cylinder 101, said rack 201 meshes with a gear 202 encircling the upper end of said load-bearing locking shaft 301.

Said two-way cylinder-operated hydraulic cylinder 101 is adopted to effectively reduce occupied space and makes layout more compact. It can be used in places that are inconvenient for persons to manually operate with small space and poor environment.

The input torque and rotation angle of the load-bearing locking shaft 301 can be ensured by adjusting the diameter of the gear 202, thereby better optimizing the pressure and volume of the two-way cylinder-operated hydraulic cylinder 101 and the number of the protrusions 303 at the lower end of the load-bearing locking shaft 301 further to evenly distribute the load on the load-bearing locking shaft 301.

Figure 4:
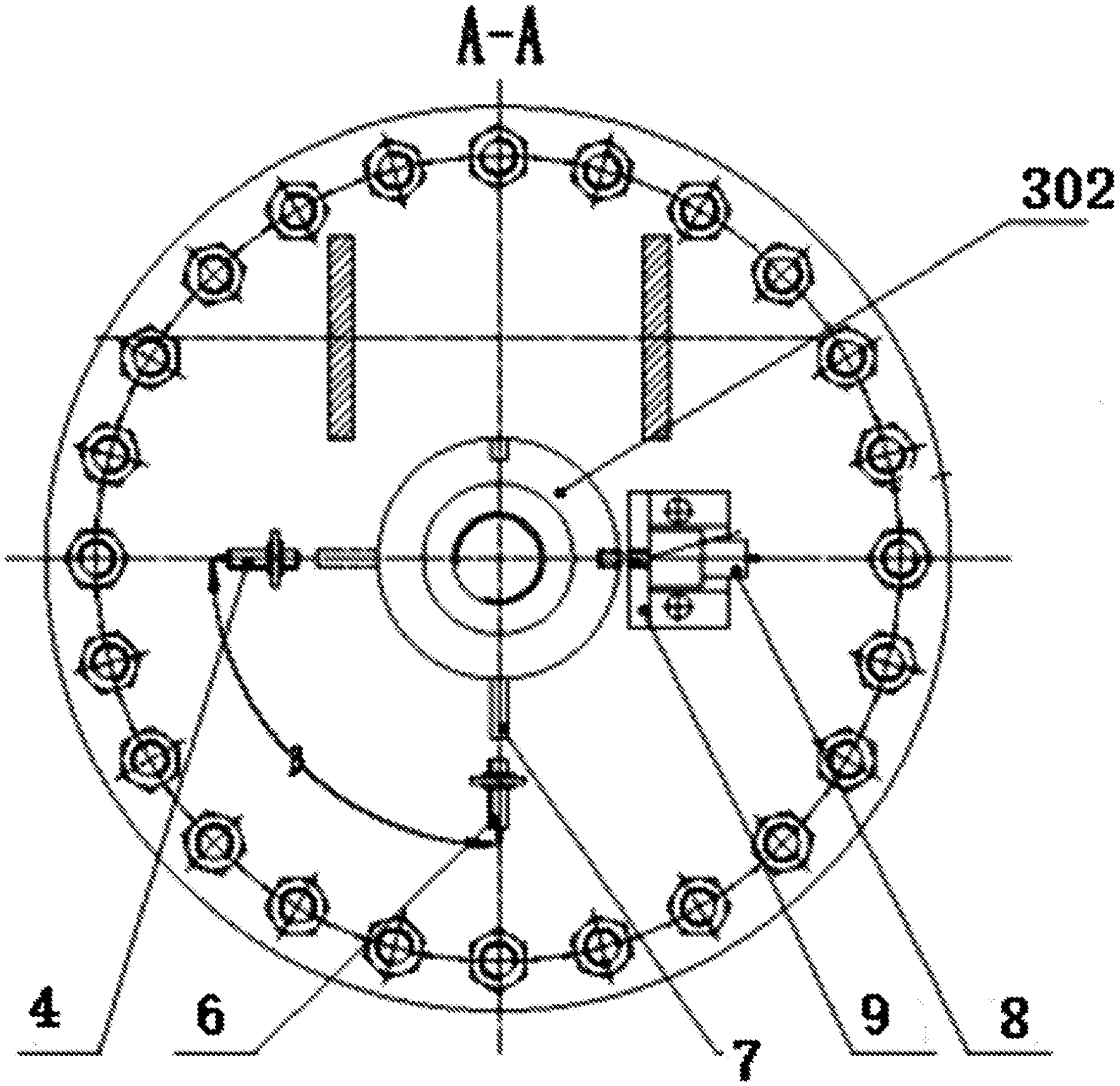
FIG. 4 is a layout diagram of the positioning system in the locking state of the invention.
Figure 5:
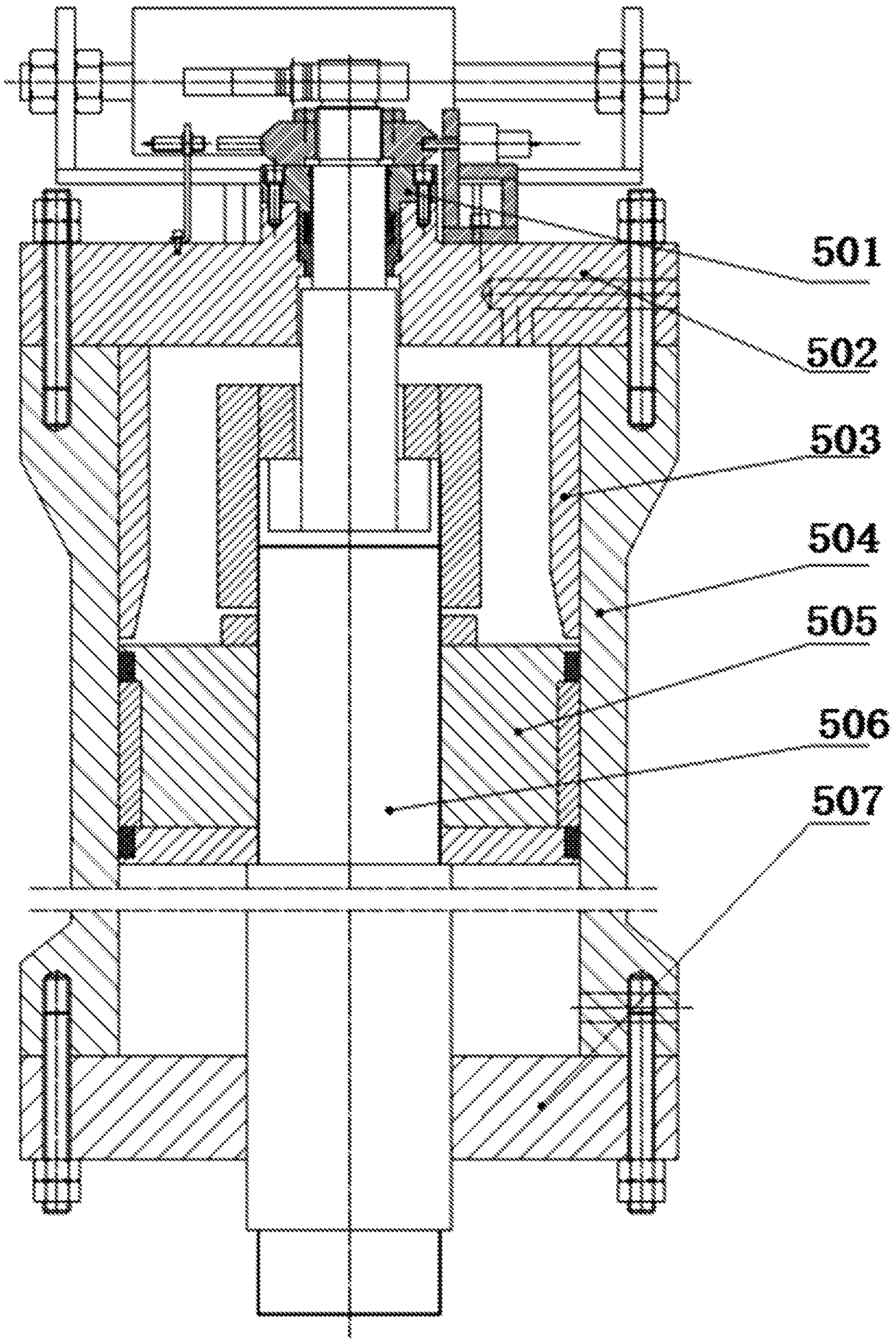
FIG. 5 is a cross-sectional view of the main hydraulic hoist of the invention.
Figure 6:
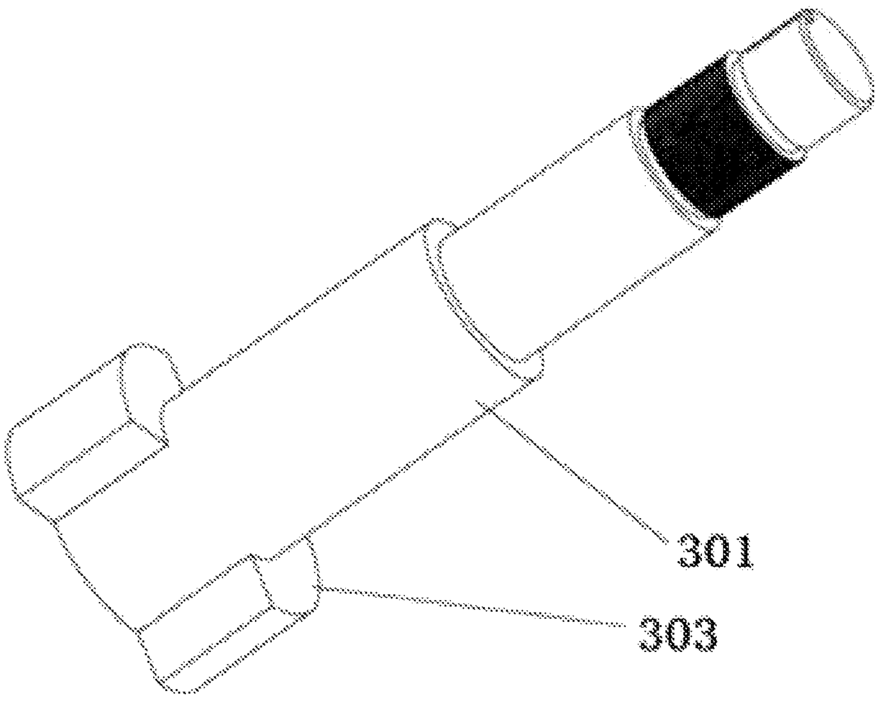
FIG. 6 is a three-dimensional view of the load-bearing locking shaft of the invention.
Figure 7:
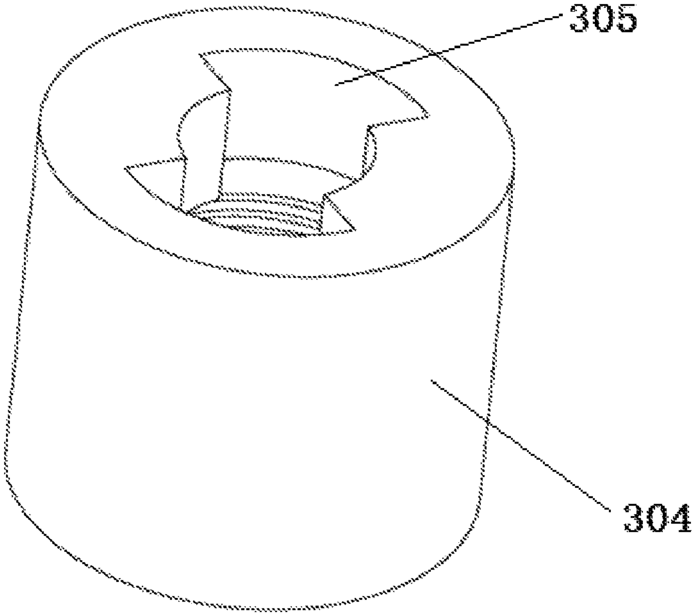
FIG. 7 is a three-dimensional view of the locking cover of the invention.

Preferable, as shown in FIG. 4, said device further includes a positioning system having an unlocking position sensor 4, a main hydraulic hoist 5 and a sensor contact head 7, said unlocking position sensor 4 and said locking position sensor 6 are provided on said upper end cover 502, said sensor contact head 7 is provided on said load-bearing nut 302.

an electromagnetic bolt 8 with position feedback is provided on said upper end cover 502, said electromagnetic bolt 8 is installed on said upper end cover 502 through an electromagnetic bolt support, a bolt hole 306 matching with the bolt head of said electromagnetic bolt 8 is provided on said load-bearing nut 302.

The rotation position of the load-bearing nut 302 is judged by the unlocking position sensor 4 and the locking position sensor 6, thereby controlling the insertion of the bolt head into the bolt hole 306 through the electromagnetic bolt 8 to enable the load-bearing locking shaft 301 to be limitedly locked, realizing remote anti-movement operation and improving automatization.

Preferably, the length L of the rack 201 is $\pi r/n$, n is the number of the protrusions 303, and r is the pitch radius of the gear 202.

The effective contact length L between the rack 201 and the gear 202 ensures the rotation angle of the load-bearing locking shaft 301. From contacting to separating of the rack 201 and the gear 202, the effective contact length L is fixed, thereby reliably ensuring the rotation angle of the load-bearing locking shaft 301, preventing the rotation angle of the load-bearing locking shaft 301 from deviating when the unlocking position sensor 4 or the locking position sensor 6 fails.

The included angle β between the unlocking position sensor 4 and the locking position sensor 6 is 180°/n, and n is the number of the protrusions 303.

In this embodiment, n is 2.

A control method of an auto-lock hydraulic hoist cylinder device includes the following steps.

The steps form unlocking status to locking status are as follows:

S1: injecting hydraulic oil into the rod cavity side (lower cavity) of main hydraulic hoist 5, the hydraulic oil acting on the lower end of the piston 505 to drive the piston rod 506 to move upwards, and to drive the locking cover 304 to move upwards, the hydraulic oil discharging from the rodless cavity side (upper cavity) of main hydraulic hoist 5, the protrusion 303 passing along the groove 305, the groove 305 moving to the top of the protrusion 303, the piston 505 contacting the lower end surface of the limit block 503 fixed on the upper end cover 502 and then stopping its movement.

S2: the electromagnetic bolt 8 with position feedback being energized, and the bolt head of the electromagnetic bolt 8 retracting to unlock the load-bearing mechanism 3, the lock actuator 1 driving the load-bearing locking shaft 301 to rotate after being driven by the lock transmission mechanism 2 to misalign the protrusion 303 and the groove 305. Specifically, the hydraulic oil passes through the left oil pipe of the two-way cylinder-operated hydraulic cylinder 101, while the cylinder barrel moves to the left, driving the rack 201 to move to the left, and the left end of the rack 201 contacts the gear 202 so that the gear 202 drives the load-bearing locking shaft 301 to rotate counterclockwise. When the right end of the rack 201 separates from the gear 202, the load-bearing locking shaft 301 stops rotating, misaligning the protrusion 303 and the groove 305, and the sensor contact head 7 fixed on the load-bearing nut 302 rotates to the locking position sensor 6 which sends out locking signal.

S3: inserting said bolt head of the electromagnetic bolt 8 into the bolt hole 306 to lock the load-bearing mechanism 3, decompressing the rod cavity side (lower cavity) of the main hydraulic hoist 5, the piston rod 506 moving downwards, the protrusion 303 contacting the locking cover 304, the load being transferred to the upper end cover 502 through the load-bearing locking shaft 301 and the load-bearing nut 302 to complete locking, The steps form locking status to unlocking status are as follows:

B1: injecting hydraulic oil into the rod cavity side of the main hydraulic hoist 5, said hydraulic oil acting on the lower end of the piston 505 to drive the piston rod 506 to move upwards, and to drive the locking cover 304 to move upwards, the upper end surface of the piston 505 contacting the lower end surface of the limit block 503 fixed on the upper end cover 502 and then stopping its movement, the protrusion 303 being separated from the locking cover 304, and the load being borne by the hydraulic oil.

B2: before the load-bearing locking shaft 301 rotates, the electromagnetic bolt 8 with position feedback being energized, and the bolt head of the electromagnetic bolt 8 retracting to unlock the load-bearing mechanism 3, the lock actuator 1 driving the load-bearing locking shaft 301 to rotate after being driven by the lock transmission mechanism 2 to align the protrusion 303 and the groove 305. Specifically, the hydraulic oil passes through the right oil pipe of the two-way cylinder-operated hydraulic cylinder 101, while the cylinder barrel moves to the right, driving the rack 201 to move to the right, and the right end of the rack 201 contacts the gear 202 so that the gear 202 drives the load-bearing locking shaft 301 to rotate clockwise. When the left end of the rack 201 separates from the gear 202, the load-bearing locking shaft 301 stops rotating, aligning the protrusion 303 and the groove 305, and the sensor contact head 7 fixed on the load-bearing nut 302 rotates to the unlocking position sensor 4 which sends out unlocking signal.

B3: inserting the bolt head of said electromagnetic bolt 8 into the bolt hole 306 to lock the load-bearing mechanism 3, injecting hydraulic oil into the rodless cavity side of the main hydraulic hoist 5, the hydraulic oil acting on the upper end of the piston 505 to drive the piston rod 506 to move downwards, discharging the hydraulic oil in the rod cavity side of the main hydraulic hoist 5, the locking cover 304 moving downwards to unlock, after unlocking, the hydraulic oil acting on the piston 505 in the main hydraulic hoist 5 to drive the piston rod 506 to perform the required operation

What is claimed is:

1. An auto-lock hydraulic hoist cylinder device, comprising: a lock actuator (1), a lock transmission mechanism (2) and a load-bearing mechanism (3), wherein said load-bearing mechanism includes a load-bearing locking shaft (301), a load-bearing nut (302) is provided on said load-bearing locking shaft (301), installed on the upper side of an upper end cover (502) of a main hydraulic hoist (5), a number of protrusions (303) are provided on the lower end of said load-bearing locking shaft (301), a locking cover (304) is provided with a through hole for said load-bearing locking shaft (301) to pass through, a groove (305) for matching said protrusions (303) is provided on the side wall of the through hole, a piston rod (506) is fixed with the lower end of said locking cover (304), said lock actuator (1) is provided on said upper end cover (502), and drives said load-bearing locking shaft (301) via said lock transmission mechanism (2).

2. The auto-lock hydraulic hoist cylinder device according to claim 1, wherein said lock actuator_(1) includes a two-way cylinder-operated hydraulic cylinder (101), a unit piston rod (102) at both ends of said two-way cylinder-operated hydraulic cylinder (101) is installed on said upper end cover (502) through a support (103), said lock transmission mechanism (2) includes a rack (201) arranged on the outer wall of a movable hydraulic cylinder (104) of said two-way cylinder-operated hydraulic cylinder (101), said rack (201) meshes with a gear (202) encircling the upper end of said load-bearing locking shaft (301).

3. The auto-lock hydraulic hoist cylinder device according to claim 2, wherein the length L of said rack (201) is $\pi r/n$, n is the number of said protrusions (303), and r is the pitch radius of said gear (202).

4. The auto-lock hydraulic hoist cylinder device according to claim 1, wherein said load-bearing nut (302) is fixed by a locking nut.

5. The auto-lock hydraulic hoist cylinder device according to claim 1, wherein said device further includes a positioning system having an unlocking position sensor (4), a main hydraulic hoist (5), a locking position sensor (6), and a sensor contact head (7), said unlocking position sensor (4) and said locking position sensor (6) are provided on said upper end cover (502), said sensor contact head (7) is provided on said load-bearing nut (302).

6. The auto-lock hydraulic hoist cylinder device according to claim 5, wherein an electromagnetic bolt (8) with position feedback is provided on said upper end cover (502), said electromagnetic bolt (8) is installed on said upper end cover (502) through an electromagnetic bolt support, a bolt hole (306) matching with the bolt head of said electromagnetic bolt (8) is provided on said load-bearing nut (302).

7. A control method for the auto-lock hydraulic hoist cylinder device according to claim 6, comprising:

steps for operating the device from a locked status to an unlocked status includes:

S1: injecting hydraulic oil into a rod cavity side of said main hydraulic hoist (5), said hydraulic oil acting on the lower end of a piston (505) to drive said piston rod (506) to move upwards, and to drive said locking cover (304) to move upwards, said protrusions (303) passing along said groove (305), said groove (305) moving to the top of said protrusions (303), said piston (505) contacting the lower end surface of a limit block (503) fixed on said upper end cover (502) and then stopping its movement, S2: said lock actuator (1) driving said load-bearing locking shaft (301) to rotate via the lock transmission mechanism (2) to misalign said protrusions (303) and said groove (305), S3: decompressing the rod cavity side of said main hydraulic hoist (5), said piston rod (506) moving downwards, said protrusions (303) contacting said locking cover (304), a load of the cylinder device being transferred to said upper end cover (502) through said load-bearing locking shaft (301) and said load-bearing nut (302) to complete locking, steps for operating the device from a locked status to an unlocked status includes:

B1: injecting hydraulic oil into the rod cavity side of said main hydraulic hoist (5), said hydraulic oil acting on the lower end of said piston (505) to drive said piston rod (506) to move upwards, and to drive said locking cover (304) to move upwards, the upper end surface of said piston (505) contacting the lower end surface of said limit block (503) fixed on said upper end cover (502) and then stopping its movement, said protrusions (303) being separated from said locking cover (304), and the load being borne by the hydraulic oil, B2: said lock actuator (1) driving said load-bearing locking shaft (301) to rotate via the lock transmission mechanism (2) to align said protrusions (303) and said groove (305), B3: injecting hydraulic oil into a rodless cavity side of said main hydraulic hoist (5), said hydraulic oil acting on the upper end of said piston (505) to drive said piston rod (506) to move downwards, discharging the hydraulic oil in the rod cavity side of said main hydraulic hoist (5), said locking cover (304) moving downwards to unlock, after unlocking, the hydraulic oil continues acting on said piston (505) in said main hydraulic hoist (5) to drive said piston rod (506) to performa required operation.

8. The control method of an auto-lock hydraulic hoist cylinder device according to claim 7, wherein in S2, before said load-bearing locking shaft (301) rotates, said electromagnetic bolt (8) with position feedback is energized, and the bolt head of said electromagnetic bolt (8) retracts to unlock said load-bearing mechanism (3), in S3, said bolt head of said electromagnetic bolt (8) is inserted into said bolt hole (306) to lock sad load-bearing mechanism (3); in B2, before said load-bearing locking shaft (301) rotates, said electromagnetic bolt (8) with position feedback is energized, and the bolt head of said electromagnetic bolt (8) retracts to unlock said load-bearing mechanism (3), in B3, said bolt head of said electromagnetic bolt (8) is inserted into said bolt hole (306) to lock said load-bearing mechanism (3).

9. The auto-lock hydraulic hoist cylinder device according to claim 5, wherein the included angle $\beta$ between said unlocking position sensor (4) and said locking position sensor (6) is $180°/n$, and n is the number of said protrusions (303).

* * * * *